US012480538B2

(12) United States Patent
Iimure et al.

(10) Patent No.: US 12,480,538 B2
(45) Date of Patent: Nov. 25, 2025

(54) CONNECTION STRUCTURE

(71) Applicant: Alps Alpine Co., Ltd., Tokyo (JP)

(72) Inventors: Satoshi Iimure, Miyagi-ken (JP);
Ryushi Takeuchi, Tokyo (JP)

(73) Assignee: Alps Alpine Co., Ltd. (JP)

( * ) Notice: Subject to any disclaimer, the term of this patent is extended or adjusted under 35 U.S.C. 154(b) by 388 days.

(21) Appl. No.: 18/156,720

(22) Filed: Jan. 19, 2023

(65) Prior Publication Data

US 2023/0151835 A1 May 18, 2023

Related U.S. Application Data

(63) Continuation of application No. PCT/JP2021/027313, filed on Jul. 21, 2021.

(30) Foreign Application Priority Data

Sep. 11, 2020 (JP) .................. 2020-153251

(51) Int. Cl.
*F16B 5/02* (2006.01)
*F16B 7/18* (2006.01)
(Continued)

(52) U.S. Cl.
CPC ............ *F16B 5/0241* (2013.01); *F16B 7/182* (2013.01); *F16F 1/3732* (2013.01); *F16F 1/376* (2013.01); *Y10T 403/7061* (2015.01)

(58) Field of Classification Search
CPC ........ F16B 5/0241; F16B 5/025; F16B 5/258; F16B 7/182; Y10T 403/7047;
(Continued)

(56) References Cited

U.S. PATENT DOCUMENTS 3,038,194 A * 6/1962 Arenson ................. A47B 91/06
403/372
3,223,374 A * 12/1965 Butler ................... F16B 5/0258
267/141.4
(Continued)

FOREIGN PATENT DOCUMENTS

CN    101444401 A    6/2009
JP    H04-039346 U   4/1992
(Continued)

OTHER PUBLICATIONS

International Search Report for corresponding International Application No. PCT/JP2021/027313 dated Sep. 21, 2021 (2 Pages).

*Primary Examiner* — Amber R Anderson
*Assistant Examiner* — Kevin J Baynes
(74) *Attorney, Agent, or Firm* — Harness, Dickey & Pierce, P.L.C.

(57) ABSTRACT

A connection structure includes first and second members disposed facing each other and an elastically deformable damper, where the first and second members are connected via the damper. The damper is made of an elastically deformable material, and includes a cylindrical portion, a flange, a first vibration absorber, and a second vibration absorber. The first member includes a convex support portion and a first contact portion in contact with a first contact surface. The second member includes a concave support portion and a second contact portion in contact with a second contact surface opposite the first contact surface. Each of ribs protrudes radially outward of the cylindrical portion and extends in an axial direction. The ribs are provided alternately on an inner periphery and outer periphery of the cylindrical portion such that positions of the ribs differ from one another in a circumferential direction of the cylindrical portion.

6 Claims, 11 Drawing Sheets

(51) Int. Cl.
*F16F 1/373* (2006.01)
*F16F 1/376* (2006.01)

(58) Field of Classification Search
CPC .......... Y10T 403/7056; Y10T 403/7061; F16F 1/3732; F16F 1/376; F16F 1/38
See application file for complete search history.

(56) References Cited

U.S. PATENT DOCUMENTS

| | | | | |
|---|---|---|---|---|
| 3,494,676 A * | 2/1970 | Compton | ............ | F16C 27/063 |
| | | | | 403/372 |
| 3,534,797 A * | 10/1970 | Haug | ............ | F16B 5/0258 |
| | | | | 411/970 |
| 3,744,747 A * | 7/1973 | Busch | ............ | F16F 1/3732 |
| | | | | 248/573 |
| 4,358,098 A * | 11/1982 | Ceseri | ............ | F16B 5/0258 |
| | | | | 267/141.5 |
| 4,636,106 A * | 1/1987 | Waisbrod | ............ | F16C 27/02 |
| | | | | 403/228 |
| 4,981,390 A * | 1/1991 | Cramer, Jr. | ............ | F16D 1/0835 |
| | | | | 403/372 |
| 5,513,603 A * | 5/1996 | Ang | ............ | F02B 77/00 |
| | | | | 277/924 |
| 5,876,024 A * | 3/1999 | Hain | ............ | F16F 15/08 |
| | | | | 244/119 |
| 6,029,942 A * | 2/2000 | Daddis, Jr. | ............ | F04B 39/0044 |
| | | | | 248/673 |
| 6,227,784 B1 * | 5/2001 | Antoine | ............ | F16F 1/3732 |
| | | | | 411/353 |
| 7,163,200 B2 * | 1/2007 | Dickson | ............ | F16F 1/3735 |
| | | | | 267/293 |
| 7,393,169 B2 * | 7/2008 | Subenbach | ............ | F16B 29/00 |
| | | | | 411/51 |
| 8,016,275 B2 * | 9/2011 | Ting | ............ | F16F 1/376 |
| | | | | 267/140 |
| 8,137,041 B2 * | 3/2012 | Zhou | ............ | F16B 5/0241 |
| | | | | 411/353 |
| 8,622,376 B2 * | 1/2014 | Lavigne | ............ | F16F 1/3732 |
| | | | | 267/153 |
| 9,976,619 B2 * | 5/2018 | Yahata | ............ | F16F 1/3842 |
| 10,428,891 B2 * | 10/2019 | Koba | ............ | F16F 1/3842 |
| 11,248,645 B2 * | 2/2022 | Figge | ............ | F16B 37/067 |
| 11,698,093 B2 * | 7/2023 | Heinrichs | ............ | F16B 19/1072 |
| | | | | 411/15 |
| 2018/0156291 A1 * | 6/2018 | Seno | ............ | F16F 1/3732 |

FOREIGN PATENT DOCUMENTS

| | | | | |
|---|---|---|---|---|
| JP | H10-252795 A | | 9/1998 | |
| JP | 2016-003758 A | | 1/2016 | |
| JP | 2018-034613 A | | 3/2018 | |
| KR | 20140136010 A | * | 11/2014 | ............ F16F 1/38 |
| WO | WO-2014091783 A1 | * | 6/2014 | ............ F16F 1/3732 |
| WO | 2016-206803 A1 | | 12/2016 | |

* cited by examiner

CONNECTION STRUCTURE

CLAIM OF PRIORITY

This application is a Continuation of International Application No. PCT/JP2021/027313 filed on Jul. 21, 2021, which claims benefit of Japanese Patent Application No. 2020-153251 filed on Sep. 11, 2020. The entire contents of each application noted above are hereby incorporated by reference.

BACKGROUND OF THE INVENTION

1. Field of the Invention

The present invention relates to a connection structure.

2. Description of the Related Art

A connection structure of a vibration member via a vibration isolation member has been developed in which the vibration isolation member includes a tubular portion extending in a vertical direction and an inner ward portion disposed inside the tubular portion and having a through-hole penetrating in the vertical direction, and a beam portion that connects the tubular portion to the inner ward portion. The upper end of the tubular portion is located above the upper end of the inner ward portion, and the lower end of the tubular portion is located below the lower end of the inner ward portion. The outer periphery of the tubular portion of the vibration isolation member has a groove circumferentially formed thereon at a middle position in the vertical direction (refer to, for example, Japanese Unexamined Patent

SUMMARY OF THE INVENTION

Since the outer periphery of the tubular portion of an existing vibration isolation member has a groove circumferentially formed thereon at a middle position in the vertical direction, it is difficult to easily manufacture vibration isolation members by using a mold of a vertical pull-out type.

Accordingly, the present invention provides a connection structure that can be easily manufactured.

According to an embodiment of the present invention, a connection structure includes first and second members disposed facing each other in a relatively movable manner and a damper member, where the first and second members are connected with each other via the damper member. The damper member is made of an elastically deformable material, and the damper member includes a cylindrical portion having a through-hole that penetrates in an axial direction of the cylindrical portion, a flange portion provided on an outer periphery of the cylindrical portion so as to extend radially outward, a first vibration absorbing portion provided on an inner periphery and the outer periphery of the cylindrical portion, and a second vibration absorbing portion provided on one of a first contact surface and a second contact surface of the flange portion. The first member includes a convex support portion fitting to an inner periphery of the cylindrical portion and a first contact portion in contact with the first contact surface of the flange portion, and the second member includes a concave support portion fitting to the outer periphery of the cylindrical portion and a second contact portion in contact with a second contact surface opposite the first contact surface of the flange portion. The first vibration absorbing portion is a plurality of ribs each protruding radially outward of the cylindrical portion and extending in the axial direction of the cylindrical portion, and the plurality of ribs are provided alternately on the inner periphery and outer periphery of the cylindrical portion such that the positions of the ribs differ from one another in a circumferential direction of the cylindrical portion.

DESCRIPTION OF THE PREFERRED EMBODIMENTS

Embodiments to which a connection structure of the present invention is applied are described below.

Embodiments

Figure 1:
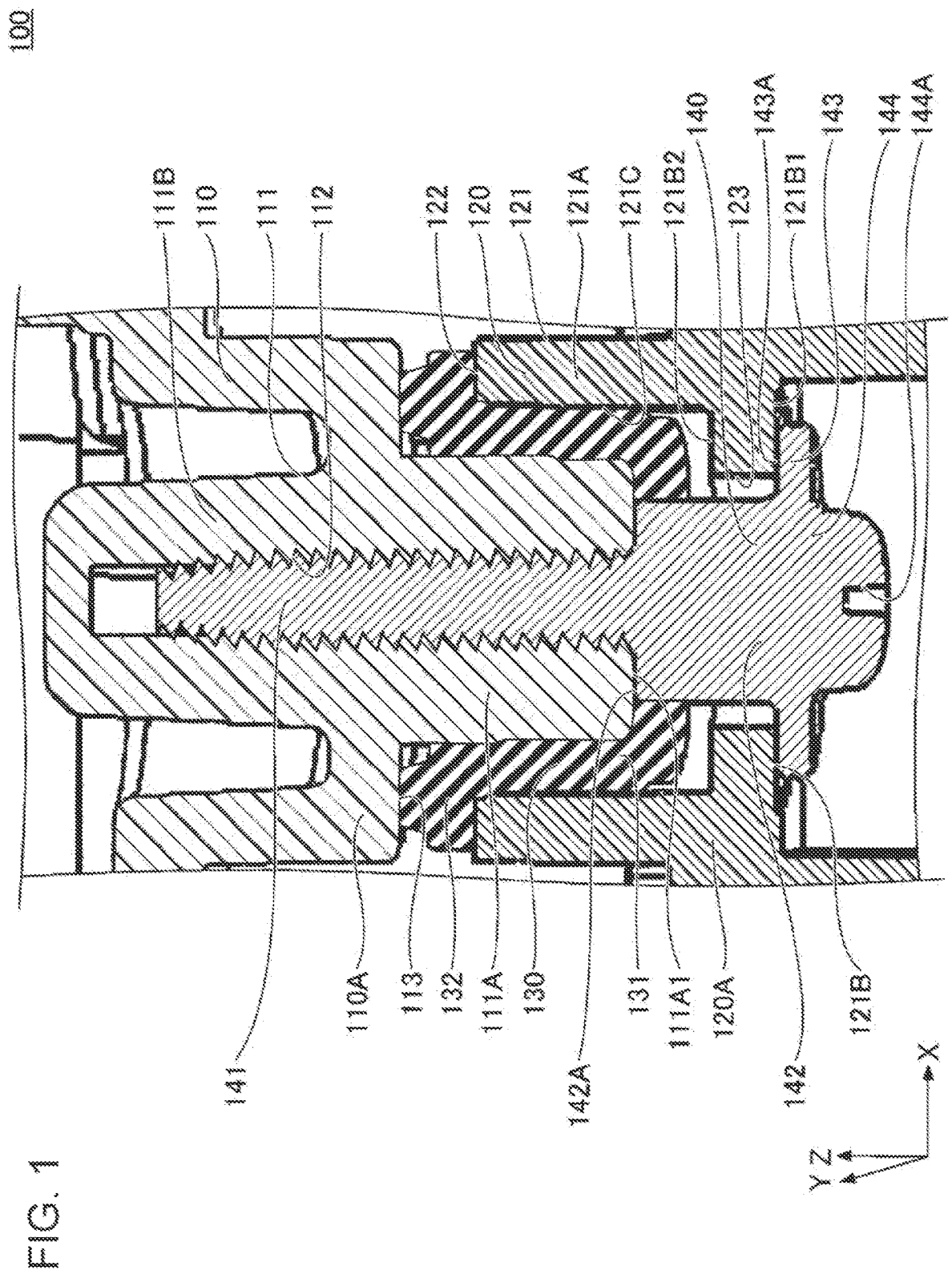
FIG. 1 illustrates the cross-sectional structure of a connection structure according to an embodiment.
Figure 2A:
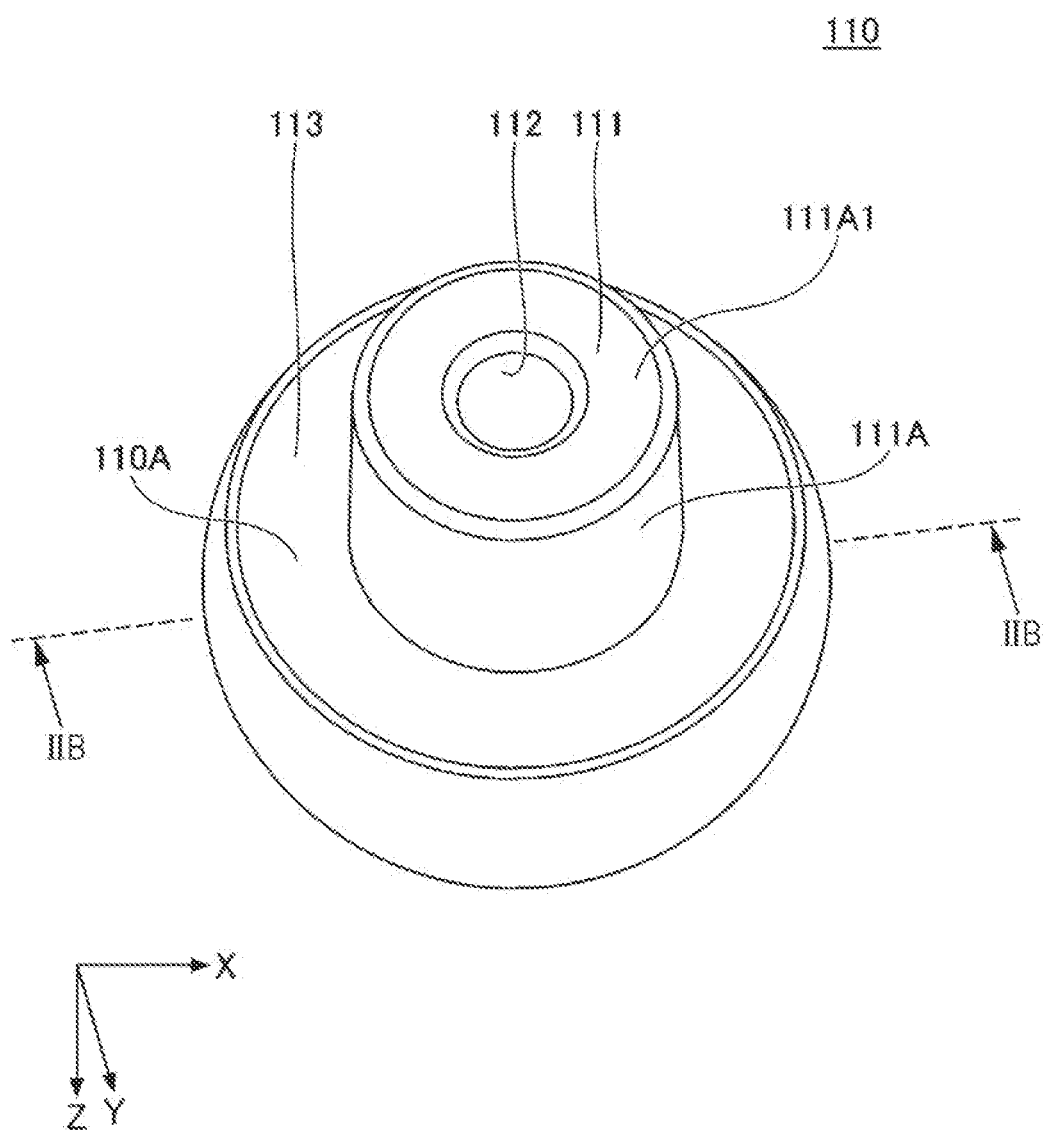
FIG. 2A illustrates a first member.
Figure 2B:
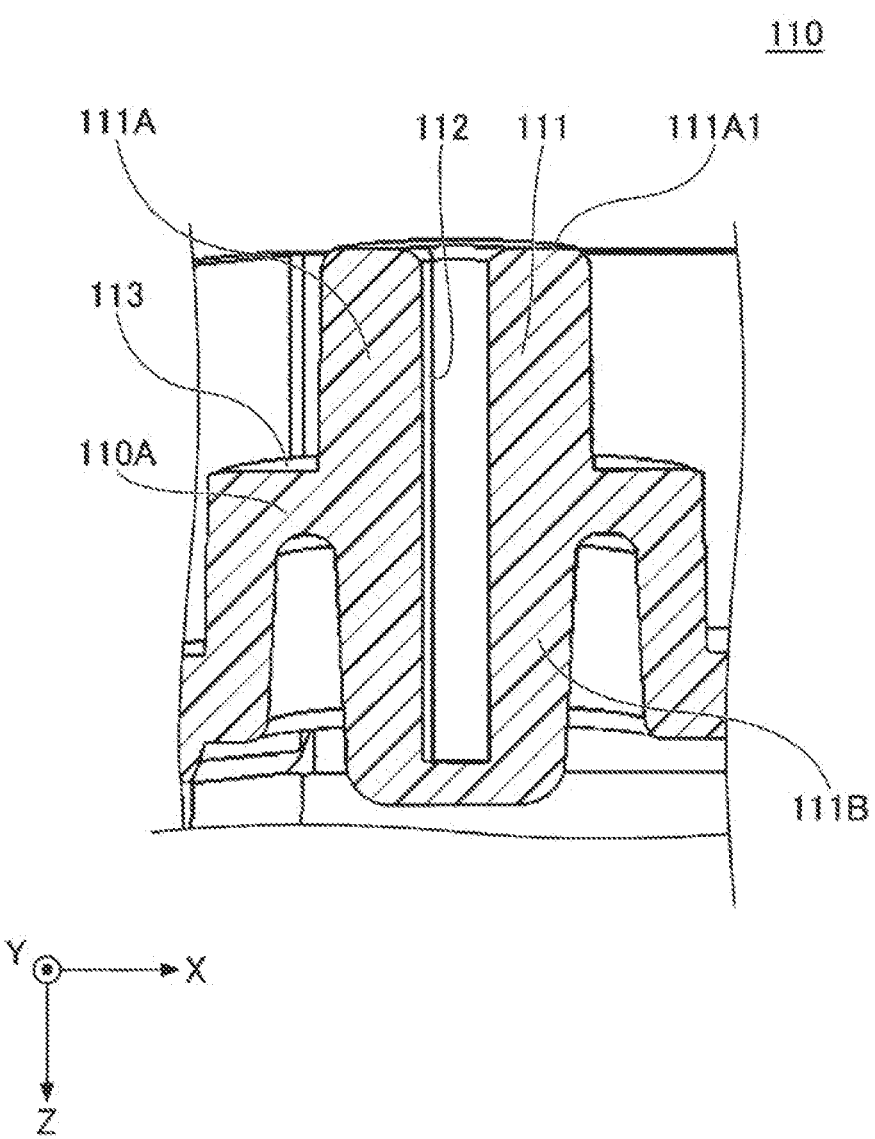
FIG. 2B illustrates the first member.
Figure 3A:
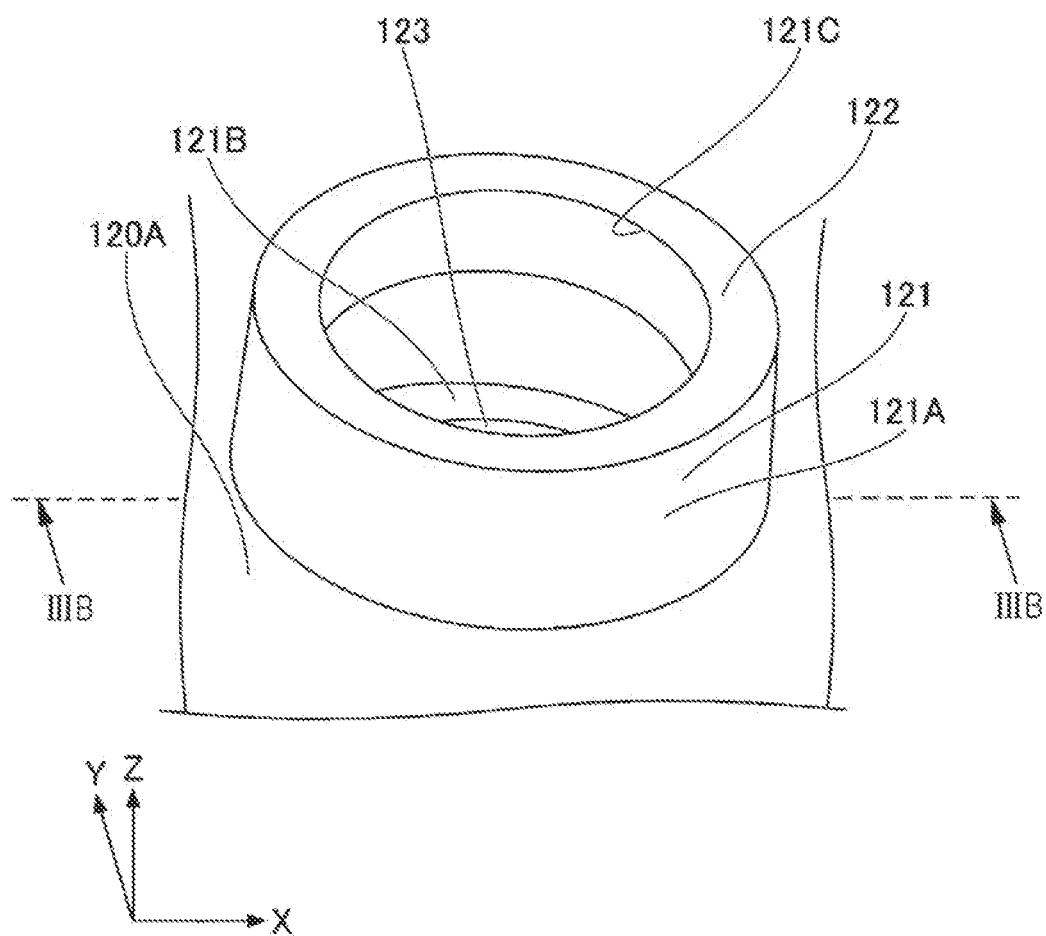
FIG. 3A illustrates a second member.
Figure 3B:
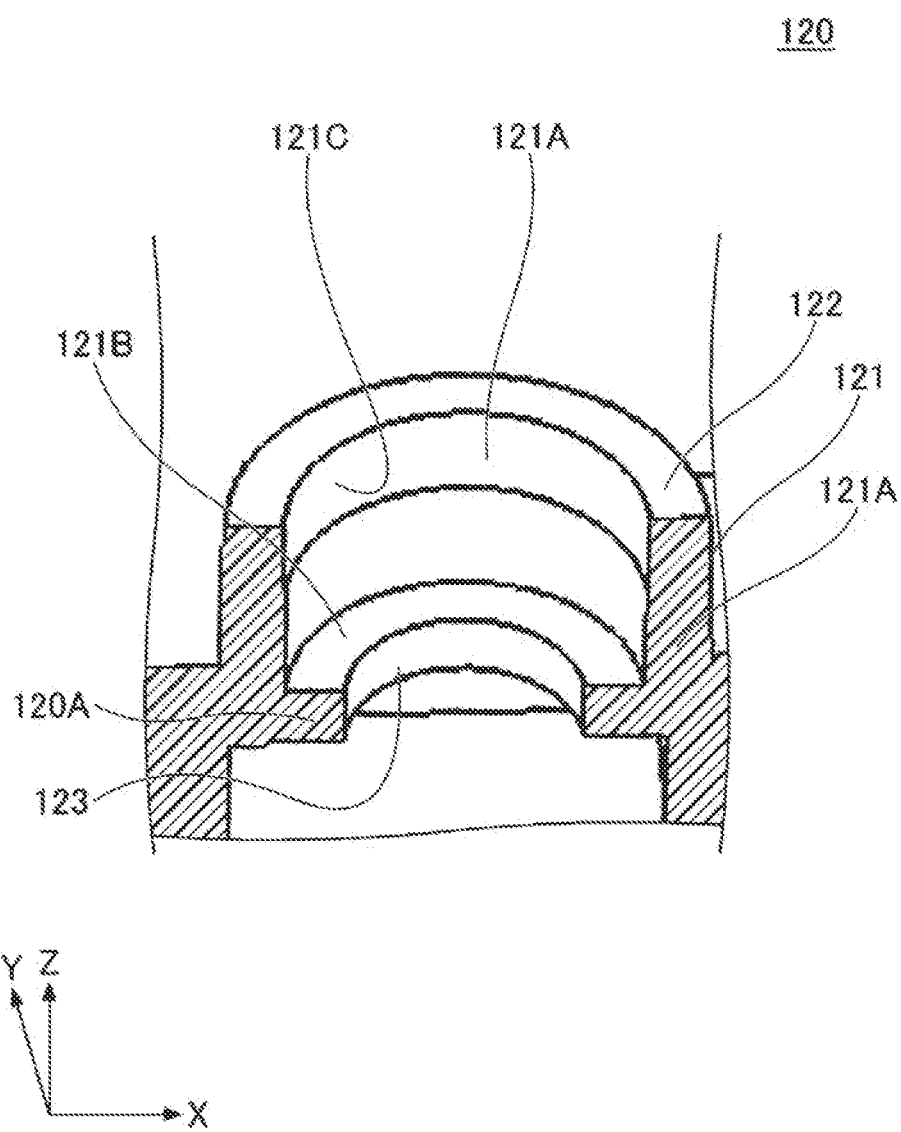
FIG. 3B illustrates the second member.
Figure 4A:
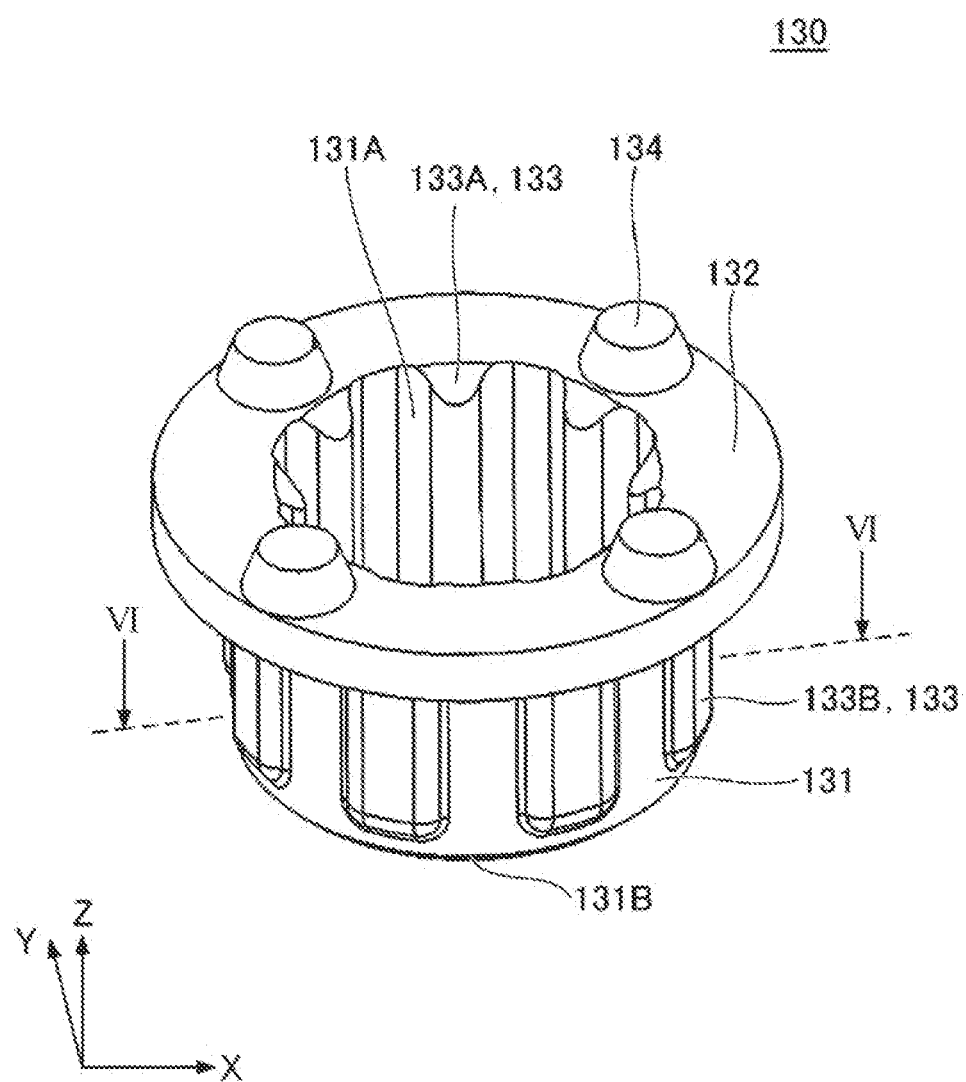
FIG. 4A illustrates a damper member.
Figure 4B:
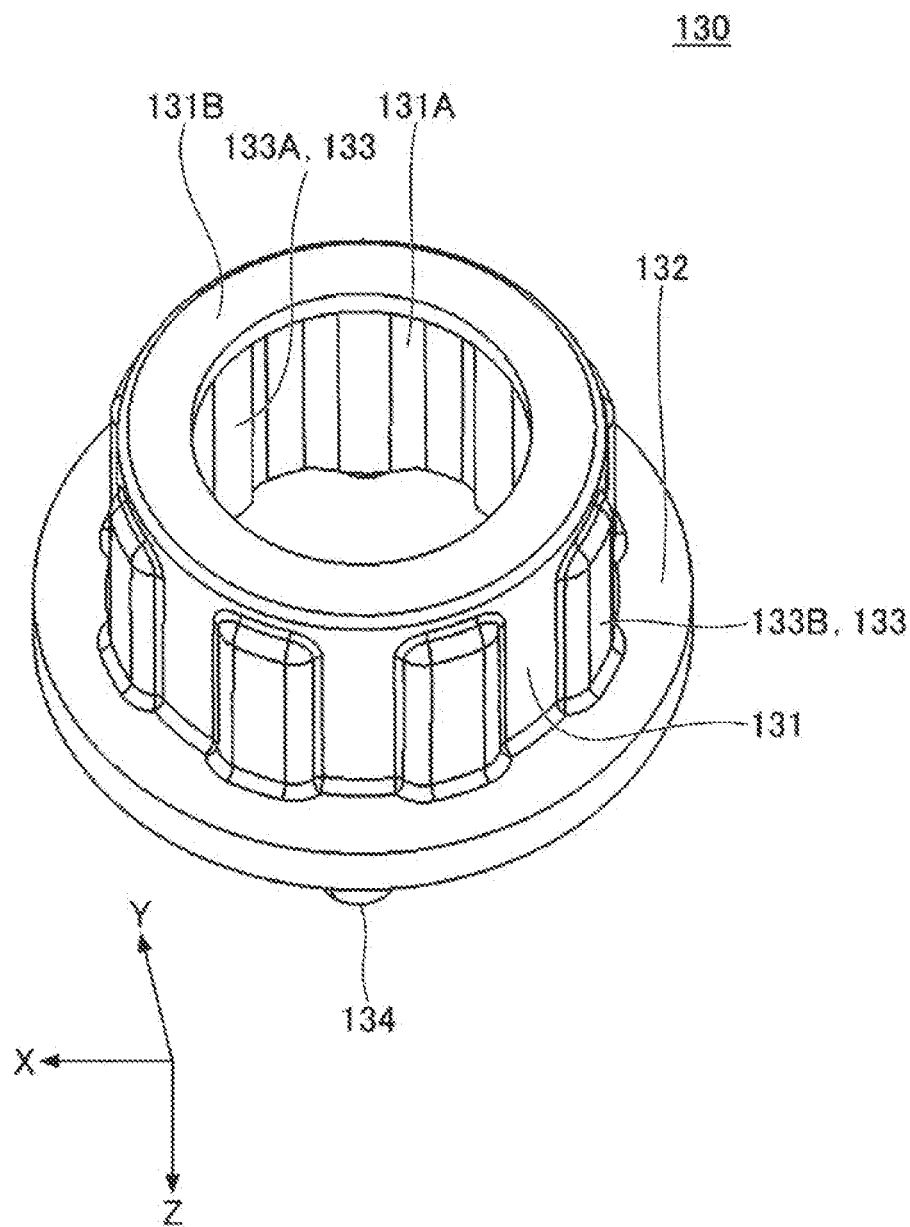
FIG. 4B illustrates the damper member.
Figure 5A:
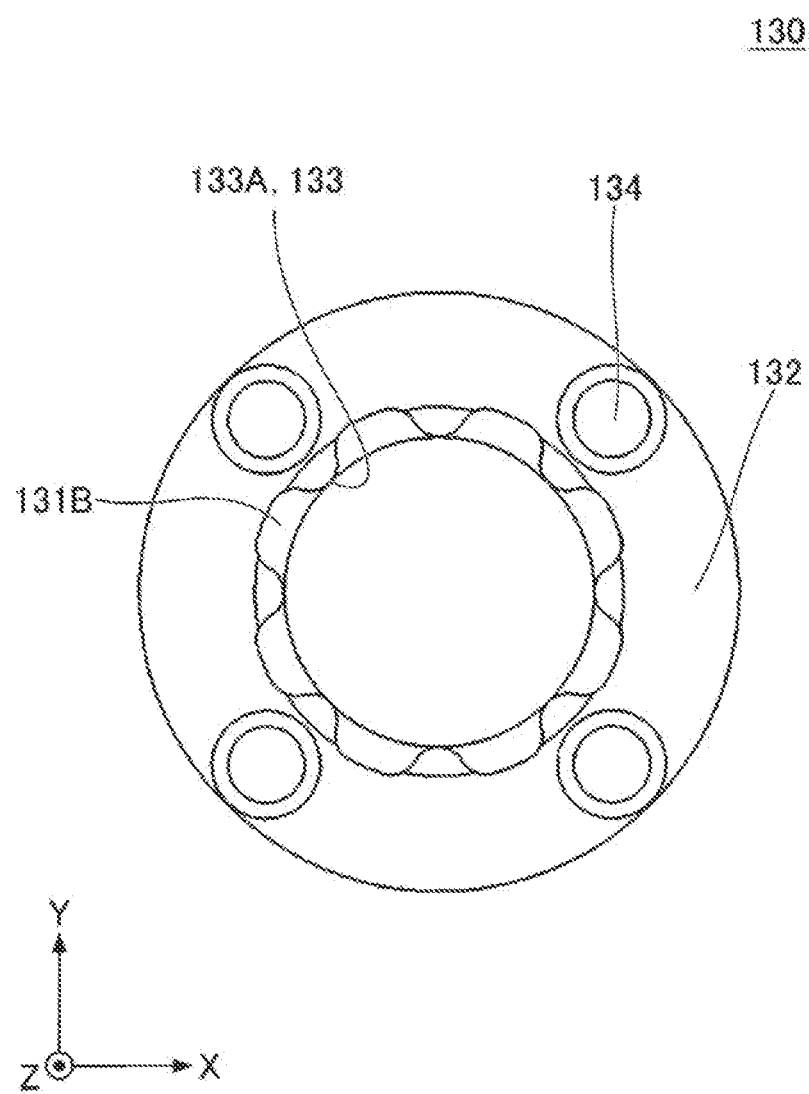
FIG. 5A illustrates the damper member.
Figure 5B:
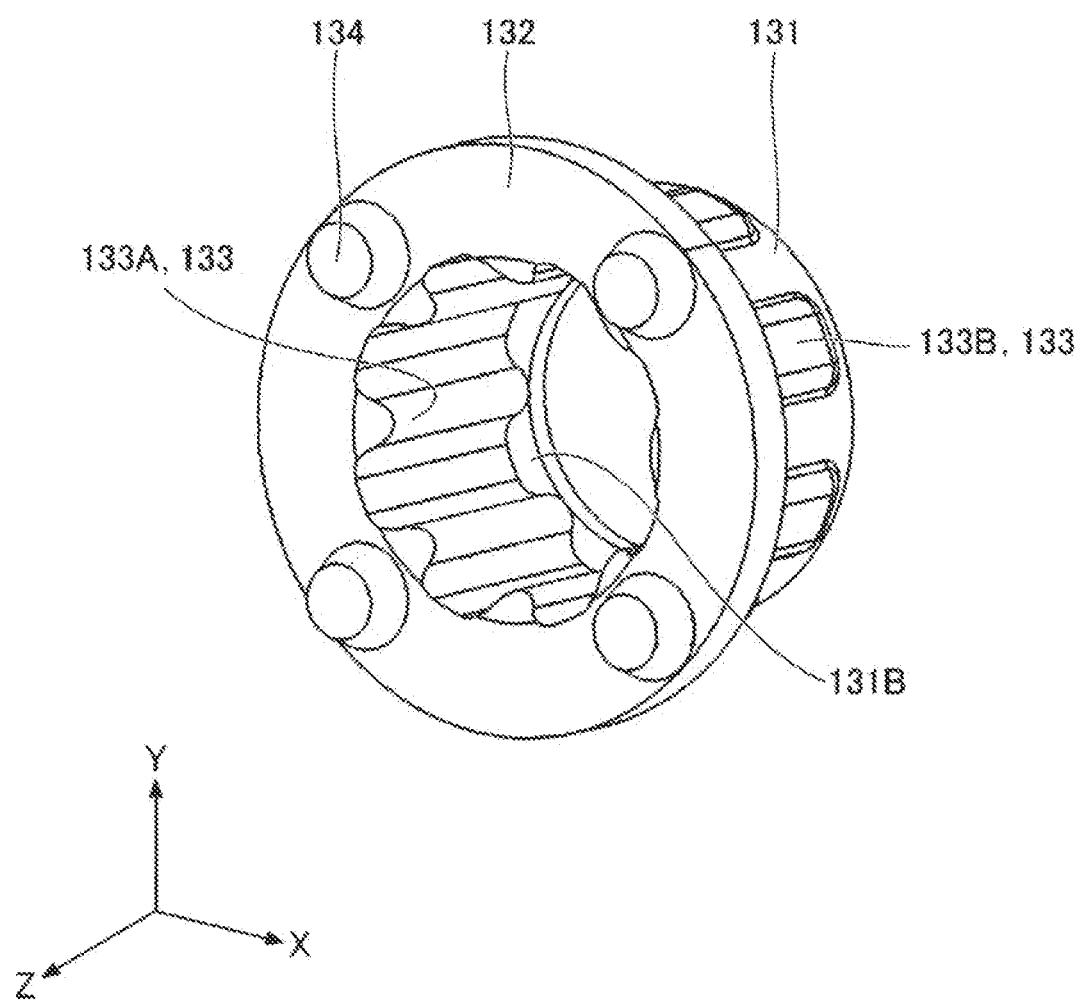
FIG. 5B illustrates the damper member.
Figure 6:
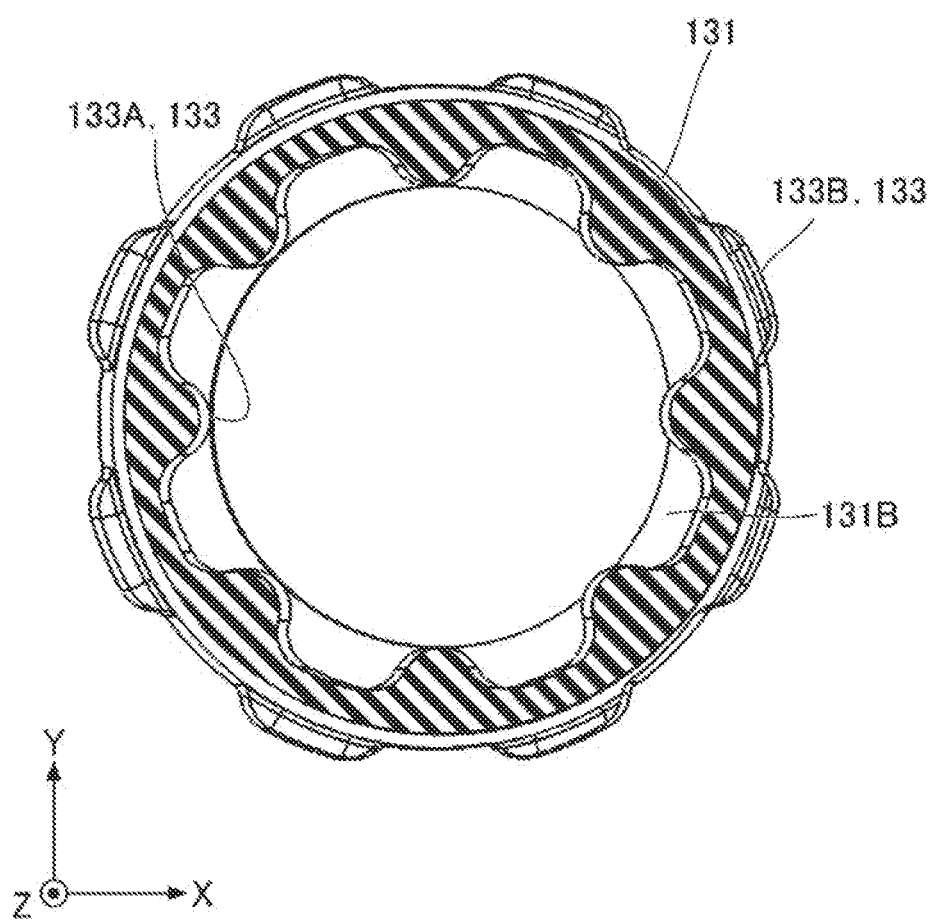
FIG. 6 illustrates the damper member.
Figure 7:
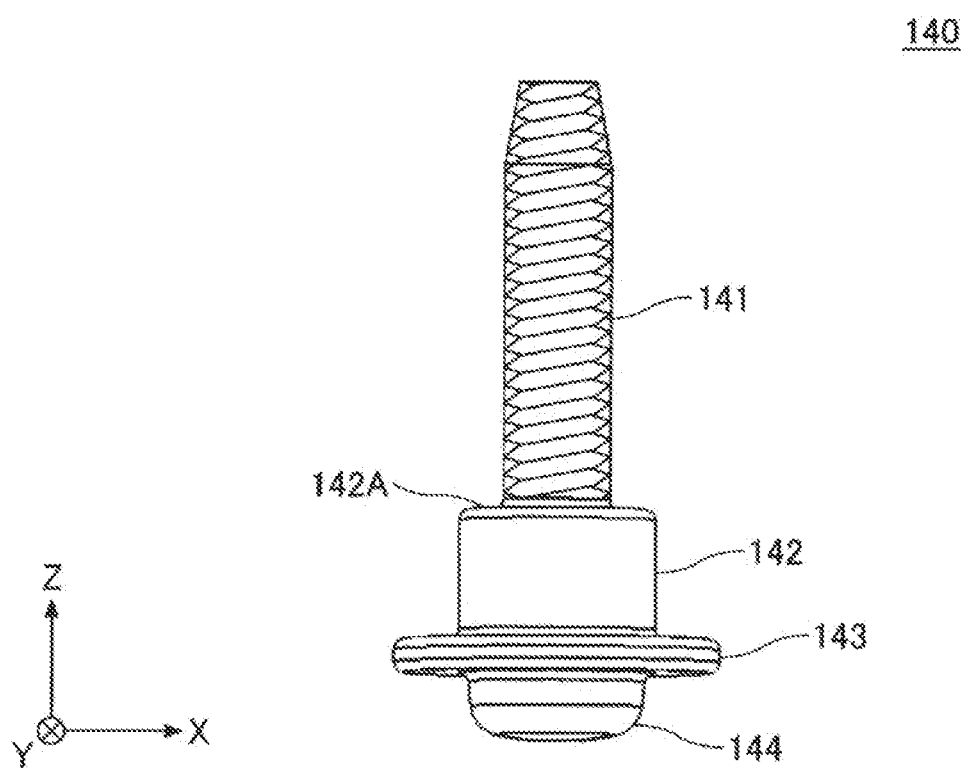
FIG. 7 illustrates a screw.

FIG. 1 illustrates the cross-sectional structure of a connection structure 100 according to an embodiment. The connection structure 100 includes a first member 110, a second member 120, a damper member 130, and a screw 140. Hereinafter, the connection structure 100 is described with reference to FIGS. 2A through 7 in addition to FIG. 1. FIGS. 2A and 2B illustrate the first member 110. FIGS. 3A and 3B illustrate the second member 120. FIGS. 4A to 6 illustrate the damper member 130. FIG. 7 illustrates the screw 140. FIG. 2B is a cross-sectional view taken along line IIB-IIB of FIG. 2A, viewed in the Y direction. FIG. 3B is a cross-sectional view taken along line IIIB-IIIB of FIG. 3A, viewed in the Y direction. FIG. 6 is a cross-sectional view taken along line VI-VI of FIG. 4A, viewed in the Z direction.

Hereinafter, an XYZ coordinate system is defined, and description is made with reference to the XYZ coordinate system. In addition, hereinafter, for convenience of description, the −Z direction side is referred to as a "lower side" or "bottom", and the +Z direction side is referred to as an "upper side" or "top". However, this does not represent a universal vertical relationship. In addition, the term "plan view" refers to the XY-plane view.

The connection structure 100 is a connection structure for connecting, via the damper member 130, the first member 110 with the second member 120 disposed facing each other in a relatively movable manner by using the screw 140. Hereinafter, an example configuration is described in which the second member 120 is fixed and the first member 110 is movable (displaceable) relative to the second member 120 in any 360 degree direction in the XY plane and the Z direction. For example, the first member 110 can be configured to be vibrated by a vibrating element or the like. However, the first member 110 may be fixed, and the second member 120 may be movable. Alternatively, the first member 110 and the second member 120 may be relatively movable, and the first member 110 and the second member 120 may both be movable relative to another constituent element.

The first member 110 includes a screw boss 111, a screw hole 112, and a first contact portion 113. The first member 110 is made of, for example, resin and is an integral part of a component. However, the first member 110 may be made of a material other than resin.

The screw boss 111 is an example of a convex support portion, and a cylindrical lower portion 111A that is a substantially lower half of the screw boss 111 protrudes downward with respect to a base portion 110A of the first member 110 and is fitted into a cylindrical portion 131 of the damper member 130. A cylindrical upper portion 111B that is a substantially upper half of the screw boss 111 protrudes upward with respect to the base portion 110A. While the configuration is described herein with reference to the lower portion 111A, which is a substantially lower half of the screw boss 111, protruding downward from the base portion 110A, the screw boss 111 only needs to have a cylindrical portion protruding downward from a reference position or reference surface, such as the base portion 110A. The entire screw boss 111 may protrude downward from the base portion 110A.

The screw hole 112 is provided so as to extend from a lower end surface 111A1 of the lower portion 111A toward the interior of the screw boss 111 and has a thread groove formed in its inner wall. The lower end surface 111A1 is an example of a protruding end of the convex support portion. In the present example, the screw hole 112 is provided from the interior of the lower portion 111A to the interior of the upper portion 111B.

The first contact portion 113 is an annular portion of the base portion 110A located around the lower portion 111A of the screw boss 111. The first contact portion 113 is in contact with the upper surface (an example of a first contact surface) of a flange portion 132 of the damper member 130. The lower surface of the first contact portion 113 is flat.

The second member 120 includes a cup portion 121, a second contact portion 122, and a through-hole 123. The second member 120 is made of, for example, resin and is an integral part of a component. However, the second member 120 may be made of a material other than resin.

The cup portion 121 is an example of a concave support portion. The cup portion 121 includes a cylindrical wall 121A protruding upward from a base portion 120A of the second member 120 and a bottom wall 121B and has a columnar recess portion 121C thereinside. The recess portion 121C is a portion surrounded by the wall 121A and the bottom wall 121B. The bottom wall 121B is an example of a bottom portion of the concave support portion. The inner periphery of the wall 121A of the cup portion 121 is fitted to the outer periphery of the cylindrical portion 131 of the damper member 130.

While the configuration is described herein with reference to the cup portion 121 including a cylindrical wall protruding upward from the base portion 120A, the cup portion 121 can have any shape that includes the columnar recess portion 121C. For example, the cup portion 121 may be a columnar recess portion recessed from the upper surface of a plate-like member that is thicker than the base portion 120A and that extends parallel to the XY plane.

The second contact portion 122 is an upper end portion of the cup portion 121 and is an annular portion. The second contact portion 122 faces the first contact portion 113 of the first member 110. The upper surface of the second contact portion 122 is flat. The second contact portion 122 is in contact with the lower surface (an example of a second contact surface) of the flange portion 132 of the damper member 130.

The through-hole 123 of the second member 120 is a hole that penetrates the bottom wall 121B of the cup portion 121 in the vertical direction. The through-hole 123 is circular in plan view and is located in the center of the bottom wall 121B in plan view. The through-hole 123 provided in the center of the bottom wall 121B of the cup portion 121 is connected to the recess portion 121C and penetrates the cup portion 121 in the vertical direction. The opening diameter of the through-hole 123 is smaller than the opening diameter of the upper recess portion 121C.

The damper member 130 includes the cylindrical portion 131, the flange portion 132, ribs 133, and projecting portions 134. The damper member 130 is made of an elastic, deformable material, such as rubber (silicon rubber or the like). The damper member 130 is provided between the first member 110 and the second member 120 and functions as a shock-absorbing material.

The cylindrical portion 131 is a portion having a cylindrical shape and including a through-hole 131A that penetrates in the axial direction (the Z direction) and an annular portion 131B. The flange portion 132 is provided on the outer periphery of the upper end of the cylindrical portion 131, and the ribs 133 are provided on the inner periphery and the outer periphery. The through-hole 131A of the damper member 130 penetrates the center portion of the cylindrical portion 131 having such a configuration from the top end to the bottom end. The opening diameter of the through-hole 131A in the center portion of the annular portion 131B is smaller than that of the upper end portion of the cylindrical portion 131.

The flange portion 132 is an annular portion provided radially outward from the outer periphery of the upper end of the cylindrical portion 131. While the configuration is described herein with reference to the flange portion 132 provided on the outer periphery of the upper end of the cylindrical portion 131, the flange portion 132 may be provided radially outward from the outer periphery at a position lower than the upper end of the cylindrical portion 131.

The ribs 133 are an example of a first vibration absorbing portion and include ribs 133A and 133B. The ribs 133A are corrugated projections provided on the inner periphery of cylindrical portion 131, and the ribs 133B are corrugated projections provided on the outer periphery of the cylindrical portion 131. Each of the ribs 133A and 133B is provided so as to extend in the axial direction (the Z direction) of cylindrical portion 131. Hereinafter, the ribs 133A and 133B are collectively referred to as "ribs 133" if not specifically distinguished.

As illustrated in FIG. 6, the ribs 133A and 133B are provided at equal intervals alternately on the inner periphery and outer periphery of the cylindrical portion 131 in the circumferential direction. The ribs 133A and 133B are provided in a staggered manner in the circumferential direction of the cylindrical portion 131 so as to be arranged at different positions in the circumferential direction. Each of the ribs 133 extends from the top end to the bottom end of the cylindrical portion 131 in the axial direction (the Z direction). More specifically, the upper end of the rib 133B is in contact with the lower surface of the flange portion 132, and the lower end of the rib 133A is in contact with the upper surface of the annular portion 131B at the lower end of cylindrical portion 131.

The plurality of ribs 133A protrude radially inward of the cylindrical portion 131 so as to be in contact with the outer periphery of the lower portion 111A of the screw boss 111 when the damper member 130 is fitted into the lower portion 111A. The plurality of ribs 133B protrude radially outward of the cylindrical portion 131 so as to be in contact with the inner periphery of the cup portion 121 when the damper member 130 is fitted into the interior of the cup portion 121. The ribs 133A and 133B absorb vibration of the first member 110 in the XY direction with respect to the second member 120.

The projecting portions 134 are an example of a second vibration absorbing portion and are provided on the upper surface of the flange portion 132. For example, four projecting portions 134 are provided on the upper surface of the flange portion 132 at equal intervals in the circumferential direction. The projecting portions 134 are, for example, conical projections. The projecting portions 134 are in contact with the first contact portion 113 of the first member 110 and are located between the first contact portion 113 and the second contact portion 122 of the second member 120 that is in contact with the lower surface of the flange portion 132 to absorb vibration of the first member 110 in the Z direction with respect to the second member 120.

The above-described damper member 130 has such a size that, when the connection structure 100 is assembled as illustrated in FIG. 1, a gap is formed between the lower end surface of the cylindrical portion 131 of the damper member 130 (the lower surface of the annular portion 131B) and an upper surface 121B2 of the bottom wall 121B of the cup portion 121. That is, the length in the Z direction of part of the cylindrical portion 131 that is lower than the flange portion 132 is required to be shorter than the length in the Z direction of the wall 121A of the cup portion 121.

In addition, the damper member 130 having the configuration described above can be manufactured with a mold of a vertical pull-out type. This is because there are no recesses that recess in the radial direction on the inner periphery and outer periphery of the damper member 130. For this reason, the damper member 130 can be easily manufactured with a mold of a vertical pull-out type that has a simple structure without a lateral slide mechanism or the like.

The screw 140 includes a threaded portion 141, a pillar portion 142, a plate portion 143, and a screw head 144. The top end of the screw 140 is located on the upper side (the +Z direction side). The threaded portion 141 is a portion having a spiral thread groove formed thereon, and the threaded portion 141 has such a size that when screwed, it is engageable with the screw hole 112 while forming a thread groove on the wall surface of the screw hole 112 of the screw boss 111 of the first member 110. The threaded portion 141 is an example of a top end side of the screw 140.

The pillar portion 142 is located closer to the screw head 144 than the threaded portion 141, and the diameter of the pillar portion 142 is larger than that of the threaded portion 141 and smaller than that of the through-hole 131A of the damper member 130. No thread grooves are formed on the outer periphery of the pillar portion 142. The diameter of the pillar portion 142 is smaller than the opening diameter of the through-hole 123 of the second member 120, and when the pillar portion 142 is inserted into the through-hole 123, a gap is formed in the radial direction so that the pillar portion 142 can vibrate from side to side. The screw 140 is thus an example of a shoulder screw that integrally includes a pillar portion 142 thicker than the threaded portion 141.

While the configuration is described herein with reference to the pillar portion 142 being part of the screw 140, the pillar portion 142 may have a different form. That is, like widely used screws, a section of the screw 140 corresponding to the pillar portion 142 may be a columnar section having an outer diameter that is the same as the outer diameter of the threaded portion 141 and having a thread groove formed thereon up to the plate portion 143, and the threaded portion 141 and the columnar section may be inserted into a cylindrical metal member having a length in the Z direction and an outer diameter that are the same as those of the pillar portion 142.

The plate portion 143 is provided between the pillar portion 142 and the screw head 144. The plate portion 143 has a larger diameter than each of the pillar portion 142 and the screw head 144 and extends radially outward beyond each of the pillar portion 142 and the screw head 144. The diameter of the plate portion 143 is larger than the opening diameter of the through-hole 123 of the lower end of the second member 120.

The screw head 144 is provided on the side of the screw 140 opposite the threaded portion 141. That is, the screw head 144 is provided under the plate portion 143. A plus or minus groove 144A is provided on the lower surface of the screw head 144.

To assemble the above-described connection structure 100, the damper member 130 is fitted into the lower portion 111A of the screw boss 111 of the first member 110 first, for example. At this time, the ribs 133A are in contact with the outer periphery of the lower portion 111A. Subsequently, the second member 120 is brought closer to the lower side of the first member 110, the damper member 130 is fitted into the interior of the cup portion 121, and the screw 140 is inserted into the through-hole 123 from below the second member 120.

Subsequently, the threaded portion 141 is inserted into the screw hole 112 of the screw boss 111 and is screwed into the screw hole 112 until an upper end surface 142A of the pillar portion 142 is brought into contact with the lower end surface 111A1 of the screw boss 111. In this way, the screw 140 is screwed to the screw hole 112. The positional relationship, in the Z direction, of the threaded portion 141, the pillar portion 142, and the plate portion 143 can be such that when the threaded portion 141 is screwed into the screw hole 112, an upper end surface 143A of the plate portion 143 is brought into contact with a lower surface 121B1 of the bottom wall 121B of the second member 120 before the upper end surface 142A of the pillar portion 142 is brought into contact with the lower end surface 111A1 of the screw boss 111. That is, the length of the pillar portion 142 in the Z direction is required to be determined so that when the upper end surface 142A of the pillar portion 142 is brought into contact with the lower end surface 111A1 of the screw boss 111, the thickness (length) of the flange portion 132 of the damper member 130 in the Z direction is compressed so as to be thinner (shorter) than the initial thickness (length).

Due to the positional relationship of these portions, when the connection structure 100 is assembled as illustrated in FIG. 1, the flange portion 132 and the projecting portions 134 of the damper member 130 are sandwiched between the first contact portion 113 of the first member 110 and the second contact portion 122 of the second member 120 and are urged in the Z direction so as to be slightly compressed and have an initial elasticity. In addition, the ribs 133A of the damper member 130 are in fitting contact with the outer periphery of the screw boss 111, and the ribs 133B of the damper member 130 are in fitting contact with the inner periphery of the cup portion 121. For this reason, each of the ribs 133 of the damper member 130 has the initial elasticity.

Furthermore, a gap is formed between the lower end surface of the damper member 130 and the upper surface 121B2 of the bottom wall 121B of the cup portion 121. Still furthermore, a gap is formed between the outer periphery of the pillar portion 142 of the screw 140 and the inner periphery of the through-hole 123, and the upper end surface 143A of the plate portion 143 is in contact with the lower surface 121B1 of the bottom wall 121B.

Thus, when after the connection structure 100 is assembled, neither a force in a direction of displacing the first member 110 relative to the second member 120 in the XY plane nor the force pressing the first member 110 downward is exerted on the first member 110, the position of the first member 110 is the initial position that is balanced by the initial elastic force of the damper member 130 inside.

Therefore, when the force in the direction of displacing the first member 110 in the XY plane relative to the second member 120 is externally exerted, the cylindrical portion 131 and the ribs 133A and 133B are further elastically deformed and, thus, the first member 110 is displaced relative to the second member 120 in the XY plane. The amount of displacement of the first member 110 is the amount of displacement caused by the elastic deformation of the cylindrical portion 131 and the ribs 133A and 133B between the outer periphery of the screw boss 111 and the inner periphery of the wall 121A of the cup portion 121. Since the ribs 133A and 133B are arranged so as to be corrugated inwardly and outwardly with respect to the cylindrical portion 131 in plan view, the ribs 133A and 133B are compressed to deform in the radial direction and, thus, are displaced in the radial direction. At this time, the cylindrical portion 131 is also compressed in the radial direction and contracts slightly. The displacement of the damper member 130 in the radial direction enables the first member 110 to be displaced relative to the second member 120 in the XY plane. When the force in the direction of displacing the first member 110 in the XY plane is removed, the elastic deformation returns to its original shape due to the elastic force of the ribs 133A and 133B and the cylindrical portion 131, and the first member 110 returns to its initial position relative to the second member 120.

When a downward pressing force is exerted on the first member 110 with respect to the second member 120, a force is exerted on the projecting portions 134, resulting in compression of the projecting portions 134 in the vertical direction and deformation of the flange portion 132. Thus, the projecting portions 134 and the flange portion 132 deform such that they are thinner than the total thickness (the total length in the Z direction) of the projecting portion 134 and the flange portion 132 before deformation. Since the four projecting portions 134 are provided on the upper surface of the annular flange portion 132 at equal intervals in the circumferential direction, the flange portion 132 is subjected to the downward force at equal intervals in the circumferential direction. Therefore, the flange portion 132 is deformed so that a region around the region where the projecting portions 134 are provided is more downwardly distorted (becomes thinner) than the region where the projecting portions 134 are not provided.

When the projecting portions 134 and the flange portion 132 are deformed in this manner, the screw 140 can be displaced downward together with the first member 110 relative to the second member 120, since the pillar portion 142 of the screw 140 is only inserted to the through-hole 123 with a clearance therebetween and is not engaged with the through-hole 123.

When, as described above, the downward pressing force is exerted on the first member 110, the first member 110 is displaceable relative to the second member 120. When the force pressing the first member 110 downward is removed, the elastic deformation of the projecting portions 134 and the flange portion 132 returns to its original shape due to their elastic forces, and the first member 110 returns to its initial position relative to the second member 120.

According to the connection structure 100 described above, the first member 110 and the second member 120 can be formed integrally, and the damper member 130 can be easily manufactured using a mold of a vertical pull-out type. As described above, to assemble the connection structure 100, the damper member 130 can be fitted into the lower portion 111A of the screw boss 111 of the first member 110, the second member 120 can be brought closer to the lower side of the first member 110, the damper member 130 can be fitted into the interior of the cup portion 121, the screw 140 can be inserted into the through-hole 123 from below the second member 120, and the threaded portion 141 can be screwed into the screw hole 112. In this manner, the connection structure 100 can be manufactured very easily.

Therefore, an easily manufacturable connection structure 100 can be provided. In addition, when the damper member 130 is assembled to the first member 110 and the second member 120, the damper member 130 can be easily assembled by moving only in the vertical direction. For this reason, automatic assembly machines can be readily employed, although automatic assembly machines are difficult to use for the structure that requires a manufacturing method including movement, such as lateral insertion. As a result, the manufacturing costs can be reduced.

In addition, since the damper member 130 includes the ribs 130A and 130B and the projecting portion 134, displacement of the first member 110 relative to the second member 120 in the lateral direction (a direction in the XY plane) and the longitudinal direction (the Z direction) can be accommodated, and vibration and the like in the lateral and longitudinal directions can be absorbed.

In addition, since the ribs 133A and 133B are provided in a staggered manner in the circumferential direction of the cylindrical portion 131 and are located in different positions in the circumferential direction, the ribs 133A and 133B can easily deform elastically in the radial direction and, thus, are displaceable in any direction in the XY plane of the first member 110 so as to absorb vibrations and the like. Furthermore, since the ribs 130A and 130B are provided at equal intervals in the circumferential direction of the cylindrical portion 131, displacement in the lateral direction (a direction in the XY plane) and absorption of vibrations and the like can be achieved in a well-balanced manner.

In addition, since the damper member 130 includes the projecting portion 134 projecting from the upper surface of the flange portion 132, the damper member 130 can be easily elastically deformed in the longitudinal direction (the Z direction), enabling more reliable displacement in the longitudinal direction (the Z direction) and absorption of vibration and the like in the longitudinal direction (the Z direction).

In addition, the first member 110 includes the screw boss 111 having a screw hole 112 formed therein, a screw 140 is inserted into the through-hole 123 of the second member 120, and assembling is achieved with the first member 110 and the second member 120 pinching the flange portion 132 of the damper member 130. As a result, assembling can be achieved with the flange portion 132 being compressed to a certain extent and, thus, the flange portion 132 can have initial elasticity at the initial position.

During assembly of the connection structure 100, the amount of compression of the flange portion 132 and the projecting portion 134 of the damper member 130 in the Z direction between the first contact portion 113 and the second contact portion 122 can be adjusted by the position at which the upper end surface 142A of the pillar portion 142 of the screw 40 is in contact with the lower end surface 111A1 of the screw boss 111. For example, the amount of compression can be adjusted by changing the length of the pillar portion 142 in the Z direction, so that the initial elastic force of the damper member 130 can be set to a desired value at the initial position of the damper member 130.

While the above configuration has been described with reference to the damper member 130 including the ribs 133A and 133B, the configuration may include either the ribs 133A or the ribs 133B.

While the above configuration has been described with reference to the configuration in which the flange portion 132 includes the projecting portions 134 on the upper surface of the flange portion 132, the projecting portions 134 may be provided on the lower surface of the flange portion 132.

While the connection structure according to an exemplary embodiment of the present invention has been described above, the present invention is not limited to the specifically disclosed embodiment, and various changes and modifications can be made without departing from the scope of the claims.

What is claimed is:

1. A connection structure comprising:
   first and second members disposed facing each other in a relatively movable manner; and
   a damper member, wherein the first and second members are connected with each other via the damper member in a connected state of the connection structure,
   wherein the damper member is made of an elastically deformable material, and the damper member includes:
      a cylindrical portion having a through-hole that penetrates in an axial direction of the cylindrical portion, wherein the cylindrical portion has first and second ends opposite to each other in the axial direction;
      a flange portion provided at the first end on an outer periphery of the cylindrical portion so as to extend radially outward, wherein the flange portion has first and second contact surfaces opposite to each other in the axial direction;
      a first vibration absorbing portion provided on an inner periphery and the outer periphery of the cylindrical portion; and
      a second vibration absorbing portion provided on one of the first contact surface and the second contact surface of the flange portion,
   wherein the first member includes;
      a convex support portion fitting to the inner periphery of the cylindrical portion in the connected state; and
      a first contact portion in contact with the first contact surface of the flange portion in the connected state,
   wherein the second member includes;
      a concave support portion fitting to the outer periphery of the cylindrical portion in the connected state;
      a second contact portion in contact with the second contact surface of the flange portion in the connected state; and
      a bottom portion located at a bottom of the concave support portion, wherein a gap is formed between the bottom portion and the second end of the cylindrical portion in the connected state,
   wherein the first vibration absorbing portion is a plurality of ribs each protruding radially outward of the cylindrical portion and extending in the axial direction of the cylindrical portion, and
   wherein the plurality of ribs are provided alternately on the inner periphery and outer periphery of the cylindrical portion such that positions of the ribs differ from one another in a circumferential direction of the cylindrical portion.

2. The connection structure according to claim 1, wherein the second vibration absorbing portion is a plurality of projections projecting from one of the first contact surface and the second contact surface in the axial direction of the cylindrical portion.

3. The connection structure according to claim 2, wherein the first member has a screw hole formed from a protruding end of the convex support portion toward an interior of the convex support portion,
   wherein the second member has a through-hole provided in the bottom portion of the concave support portion, and
   wherein the connection structure further includes a screw inserted into the through-hole of the second member and the through-hole of the damper member and screwed to the screw hole with the flange portion being pinched by the first member and the second member.

4. The connection structure according to claim 3, wherein the screw is a shoulder screw including a pillar portion adjacent to a screw head opposite a top end inserted into the screw hole, and the pillar portion is thicker than the top end.

5. The connection structure according to claim 4,
   wherein the shoulder screw has a plate portion that is provided between the screw head and the pillar portion,
   another gap is formed between an outer periphery of the pillar portion and an inner periphery of the through-hole in the bottom portion of the second member in the connected state, and
   the plate portion of the shoulder screw abuts the bottom portion of the second member in the connected state.

6. The connection structure according to claim 3,
   wherein the concave support portion of the second member is a recess having a recess opening and a recess bottom opposite to each other in the axial direction, and
   a diameter of the through-hole in the bottom portion of the second member is smaller than a diameter of the recess opening of the recess.

* * * * *